(No Model.) 8 Sheets—Sheet 1.
C. E. LORD.
CASH REGISTER AND INDICATOR.

No. 478,196. Patented July 5, 1892.

Fig. 1.

WITNESSES:
Chas. S. Goodwin.
William Claus.

INVENTOR.
C. E. Lord (No Model.) 8 Sheets—Sheet 2.
C. E. LORD.
CASH REGISTER AND INDICATOR.
No. 478,196. Patented July 5, 1892.

Fig. 2.

WITNESSES:
Chas. J. Gooding.
William Claus

INVENTOR:
C. E. Lord (No Model.) 8 Sheets—Sheet 3.

C. E. LORD.
CASH REGISTER AND INDICATOR.

No. 478,196. Patented July 5, 1892.

Fig. 3.

WITNESSES:
Chas. J. Gooding
William Claus

INVENTOR:
C. E. Lord (No Model.) 8 Sheets—Sheet 4.
C. E. LORD.
CASH REGISTER AND INDICATOR.

No. 478,196. Patented July 5, 1892.

(No Model.) 8 Sheets—Sheet 6.
C. E. LORD.
CASH REGISTER AND INDICATOR.

No. 478,196. Patented July 5, 1892.

INVENTOR.
C. E. Lord

WITNESSES.
Chas. S. Gooding
William Adam

THE NORRIS PETERS CO., PHOTO-LITHO., WASHINGTON, D. C.

(No Model.)  8 Sheets—Sheet 7.
C. E. LORD.
CASH REGISTER AND INDICATOR.
No. 478,196.  Patented July 5, 1892.

WITNESSES:
Chas. N. Gordley.
William Claus

INVENTOR:
C. E. Lord

UNITED STATES PATENT OFFICE.

CHARLES EDGAR LORD, OF BOSTON, MASSACHUSETTS, ASSIGNOR TO THE NATIONAL CASH REGISTER COMPANY, OF DAYTON, OHIO.

CASH REGISTER AND INDICATOR.

SPECIFICATION forming part of Letters Patent No. 478,196, dated July 5, 1892.

Application filed July 27, 1888. Serial No. 281,181. (No model.)

*To all whom it may concern:*

Be it known that I, CHARLES EDGAR LORD, a citizen of the United States, residing at Boston, in the county of Suffolk and State of Massachusetts, have invented certain new and useful Improvements in Cash Registers and Indicators, of which the following is a description, reference being had to the accompanying drawings, forming part of this specification.

My invention relates to that class of machines which comprise a series of operating-keys representing different values, a registering mechanism upon which the values of the operated keys are added, and indicating devices which indicate to the customers and bystanders the value of the key which is operated.

It has for its object the increased efficiency of this class of machines; and its novelty consists in the construction and new combinations of the parts which will be hereinafter set forth, and specifically pointed out in the claims.

In the accompanying drawings, Figs. 8ª and 8ᵇ are details illustrating the transfer devices between the registering-wheels.

The same numerals of reference are used to indicate identical parts in all the figures.

Figure 3:
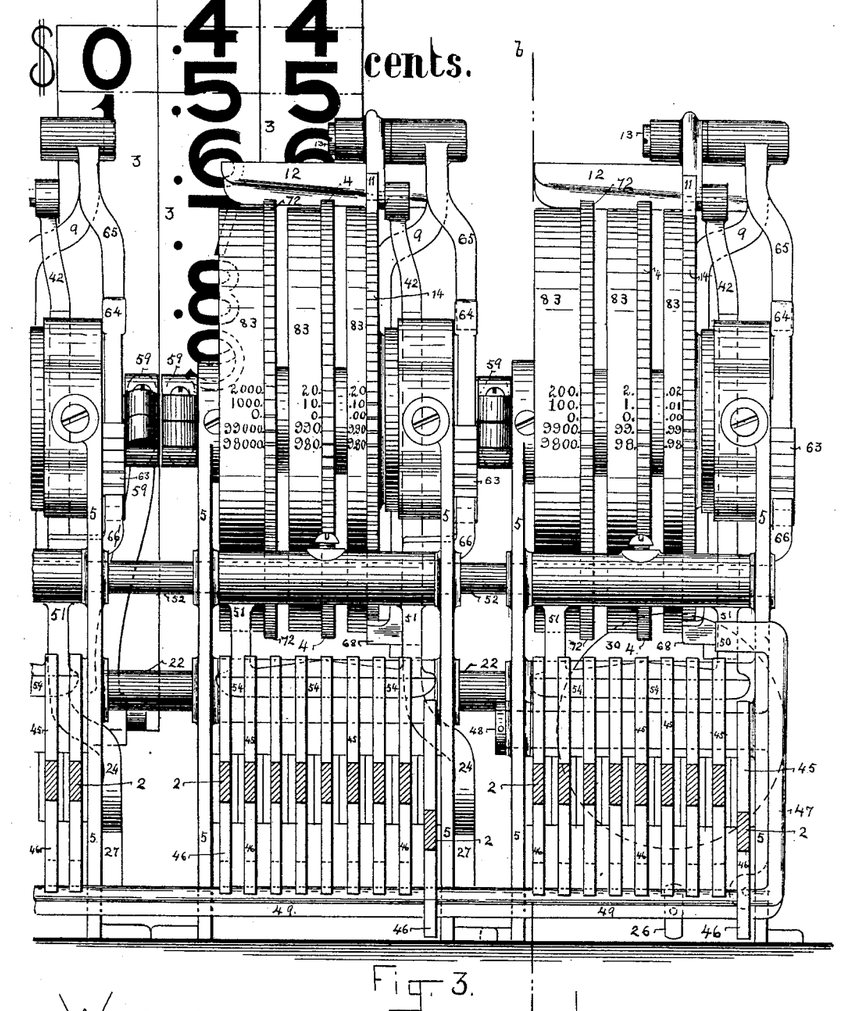
Fig. 3 is a front elevation of the machine with the front ends of the operating-keys cut off.

As illustrated in the accompanying drawings, especially in Fig. 3, my improved machine preferably comprises three or more sets of operating-keys, each set combined with its own registering mechanism and indicator. The first set—that on the right—comprises nine keys, representing units of cents from one to nine, inclusive. The next set also comprises nine keys, representing tens of cents from ten to ninety, inclusive. The third set is shown as comprising only two keys, representing, respectively, one dollar and two dollars; but it will generally be desirable to provide the third set with nine keys, representing units of dollars from one to nine, inclusive, and in some cases a fourth set, comprising nine keys representing tens of dollars from ten to ninety, inclusive, may be employed.

Figure 1:
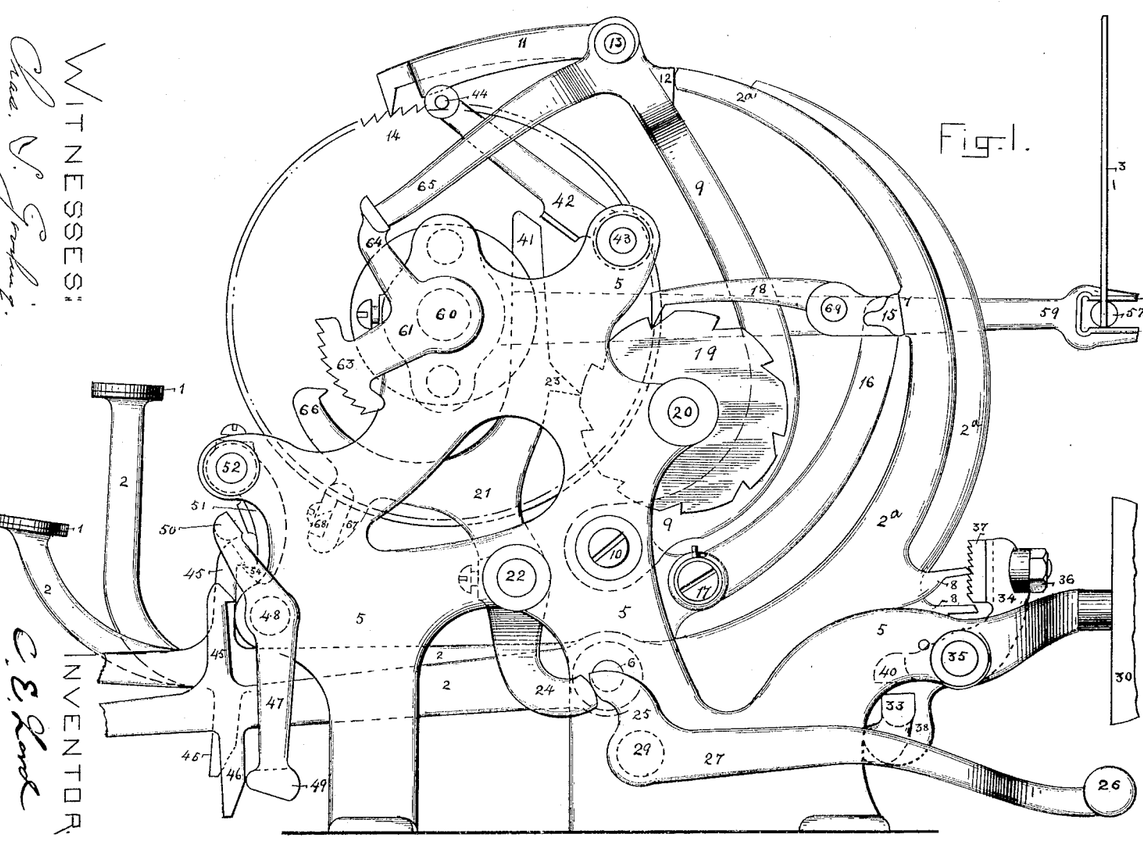
Figure 1 is an elevation of the right side of the machine with the front ends of some of the operating-keys and portions of some of the other parts broken away.
Figure 2:
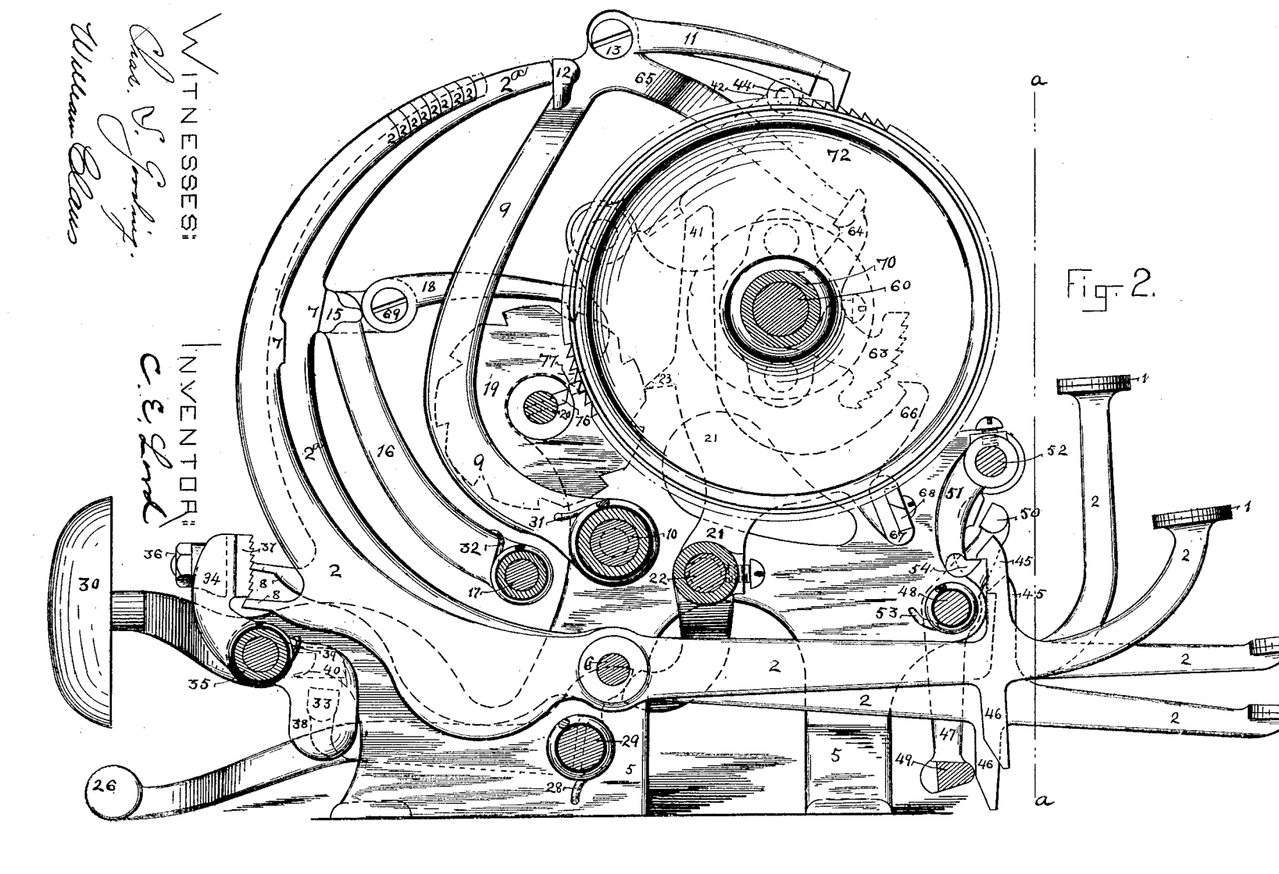
Fig. 2 is a vertical section of the machine on the line *b b* of Fig. 3, looking toward the right of the machine.
Figure 12:
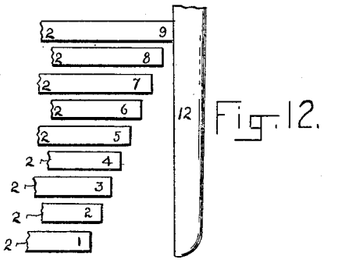
Fig. 12 is a detail plan view of the upper rear ends of the operating-keys and the bar with which they co-operate.
Figure 13:
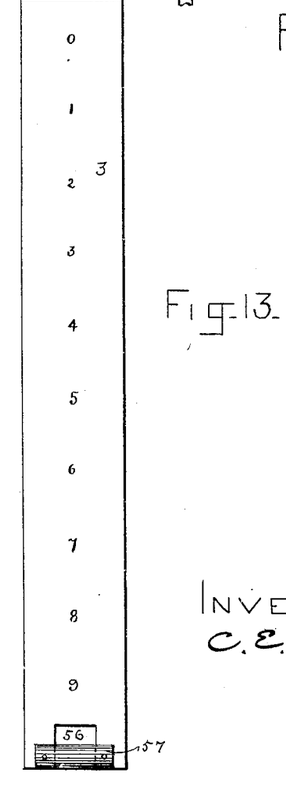
Fig. 13 is a face view of one of the indicator-plates.

So far as most of the features of my invention are concerned, each set of keys and its registering and indicating mechanism, with their associated devices, constitute a complete machine, and my invention may therefore be best understood by a description of one set alone, and for this purpose I have illustrated in most of the figures the right-hand section of the machine, which may be described as follows:

As shown in Figs. 1 and 2, the operating-keys 2 are fulcrumed upon a shaft 6, extending across the lower middle part of the machine and suitably supported in the framework, which consists, mainly, of the upright frame-plates 5. The front ends of the keys, at the left in Fig. 1 and at the right in Fig. 2, are provided with the usual numbered finger-buttons 1. The rear ends of the keys are provided with upwardly and forwardly curved extensions $2^a$, whose front ends co-operate with what may be termed a "registering-bar" 12. This bar extends transversely across the front ends of these key extensions, as shown in the detail plan view in Fig. 12, and is supported at its right-hand end upon the upper end of a curved arm 9, which is fulcrumed at its lower end upon a shaft 10 and is free to rock forward and backward upon said shaft. A suitable spring presses the arm 9 rearward and yieldingly holds it in and returns it to normal position. When the finger-button upon the front end of any key is depressed, the upper forward end of the curved extension $2^a$ of such key is thrown forward and strikes the registering-bar 12 and moves it forward. As shown in Figs. 2 and 12, the extensions $2^a$ of the keys are of different lengths, and therefore in normal position stand at different distances from the registering-bar 12. The lengths of these key extensions are so graduated that the operation of the key representing one cent will move the bar 12 a given distance, that representing two cents will move it twice such distance, that representing three cents will move three times such distance, and so on in regular order up to the nine-cent key, which will move the bar nine times as far as will the one-cent key. The same result of causing the bar 12 to be moved different distances by the operations of different keys proportionate to the values of such keys may be accomplished by making the extensions of the keys of uniform length, with their ends in the line with each other, and arranging the bar 12 at an angle to such line, or providing it with a series of graduated spaces, one to be engaged by the end of each key extension. Pivotally connected at its rear end to the bar 12 or to the upper end of the arm 9 is a forwardly-extending pawl-arm 11, whose tooth engages the ratchet of the primary registering-wheel 14. The ratchet of this wheel is preferably provided with one hundred equidistant teeth, and the periphery of the wheel itself, as shown in Fig. 3, is preferably marked with a progressive series of equidistant numbers from 1 to 99, with a zero in the hundredth space, between the 99 and 1. The adjustment of the parts is such that when any key is operated it will move the registering-bar 12 just far enough forward to cause the pawl 11 to turn the wheel 14 the exact distance necessary to register the value of the operated key. The indicator is also operated by the registering-bar 12 or its supporting-arm 9 to expose to the view of the customer and bystanders a number corresponding to that registered upon the wheel 14. As shown in the accompanying drawings, there is secured to or formed integral with the upper end of the arm 9 or registering-bar 12 a forwardly and downwardly extending arm 65, whose front end engages the upper end of an arm 64, fast upon a rock-shaft 60. The result of this construction and arrangement is that whenever any key is operated and the bar 12 thereby moved forward and the pawl 11 caused to turn the wheel 14 a portion of a revolution the arm 65 will move the arm 64 and shaft 60 a corresponding distance.

The indicator, which may be of any suitable form or arrangement, is connected to and moved by the shaft 60. It might be a wheel bearing upon its periphery large indicating-numbers and geared to said shaft; but in the drawings I have illustrated the indicator as consisting of a vertically-sliding plate 3, Figs. 1, 3, 9, 10, and 12. This indicator-plate bears upon its face a series of nine numbers corresponding to those upon the finger-buttons of the nine keys of this set and is arranged to slide up and down in suitable guides to expose its different numbers at a reading-opening in the casing, in which the working parts of the machine shown in the drawings are inclosed.

Figures 9, 11:
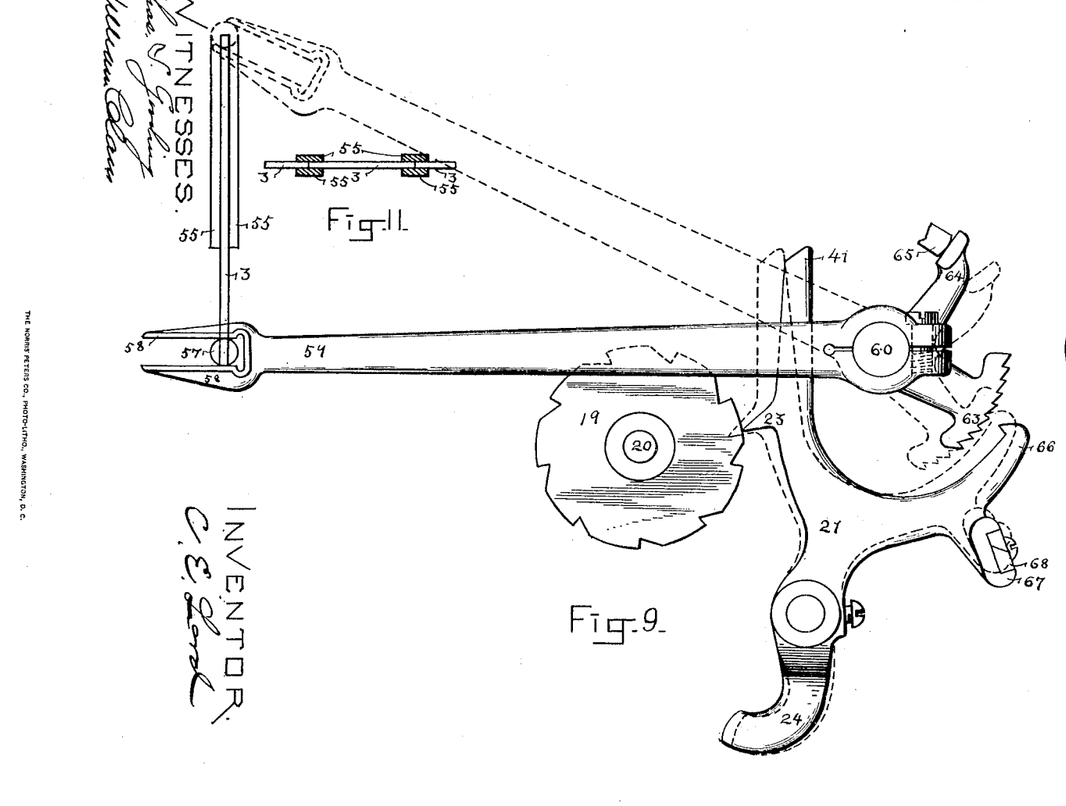
Fig. 9 is a detail side elevation of the cam-disk, part of the indicator-plate, its actuating arm or lever, the ratchet for holding the indicator in its position, the lever co-operating with the cam-disk and the ratchet, and some some associated parts.
Fig. 11 is a detail plan view of one of the indicator-plates and its guides.
Figure 10:
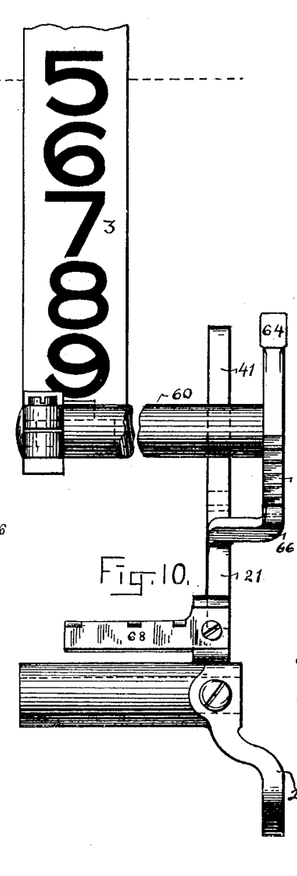
Fig. 10 is a front view of the parts shown in Fig. 9.

The indicator-plate is operated by a rearwardly-extending arm 59, Figs. 1 and 9, which is clamped at its forward end around the left-hand end of the rock-shaft 60 and at its forked rear end embraces the rod 57, in which the lower end of the indicator-plate is secured. This connection of the frame 59 with the indicator-plate permits the latter to move in vertical lines, while the end of the arm travels in the arc of a circle, as indicated by the dotted lines in Fig. 9. If this were all of the indicating mechanism, when a key was operated and its value registered on the wheel 14 the indicator-plate 3 would be lifted far enough to expose at the reading-opening its number corresponding to the value of the operated key; but upon the release of the key and resetting of the registering-bar 12 and arms 9 and 65 the indicator would drop back out of sight; but it is desirable in this class of machines that when a number is exposed to view to indicate the amount of the sale it shall remain exposed until the machine is operated to register and indicate a second sale, whereupon it must be withdrawn from view and the number or numbers indicating the second sale be exposed. For this purpose I have combined with my indicator a latch, which holds it in the position to which it is moved by the operation of any key until a second key is operated, whereupon the latch is tripped and the indicator released and dropped back out of sight or moved to a new position by the newly-operated key to indicate the value of the latter. This latch and its associated devices are very clearly shown in Fig. 1, where it will be seen that the arm 64, which is fast upon the indicator-operating shaft 60, has integral with it an arm 61, bearing a segment rack or ratchet 63. Of course the arm 61 and rack 63 might be distinct from the arm 64 and separately secured upon the shaft 60. The pawl 66 is thrown into engagement with the rack 63 at the completion of the stroke of any operated key, and thereby holds the shaft 60 and the indicator in the position to which they have been moved by the operation of such key, and at the beginning of the stroke of the next-operated key the pawl 66 is thrown out of engagement with the rack and the indicator allowed to return to normal position.

Figures 16, 17, 18, 19:
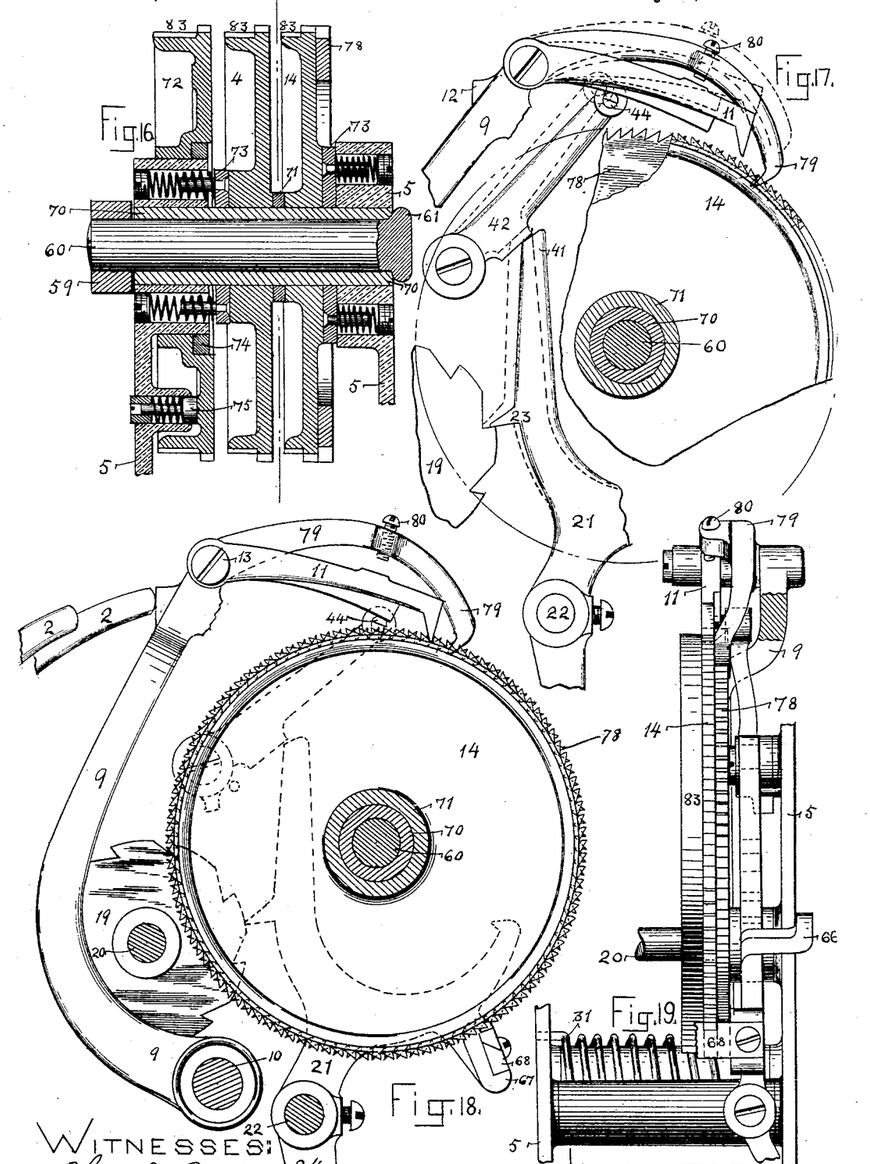
Fig. 16 is a central vertical section through a set of registering-wheels and their friction devices.
Fig. 17 is a detail showing a side elevation of part of one of the registering-wheels, the pawls co-operating therewith, the cam-disk, and the lever co-operating therewith.
Fig. 18 is a detail side elevation of the registering-wheel shown in Fig. 17 with its co-operating pawls in a different position.
Fig. 19 is a front elevation of the parts shown in Figs. 17 and 18.

The pawl 66 consists of a tooth upon one end of one arm of a lever 21, fast upon a rock-shaft 22 and provided with two other arms, one 24 extending below its fulcrum 22 and the other 41 extending upward to the upper part of the machine. A suitable spring (not shown) forces the upper portion of the lever 21 rearward and presses a tooth 23 upon the side of the arm 41 against the periphery of a cam-disk 19, mounted to revolve upon a fixed shaft 20. Upon the depression of the finger-button of any one of the operating-keys this cam-disk is turned forward the distance between two of its adjacent notches by a pawl 18, whose rear end is pivoted at 69 to a lug or ear upon a transverse bar 15, carried by an arm 16, pivoted at its lower end upon a shaft 17. The bar 15 extends across the front sides of the curved extensions of all of the keys of the set, and a spring 32, Fig. 2, coiled around the hub of the arm 16, which furnishes the bearing of the latter upon the shaft 17, forces the arm 16 rearward and presses the bar 15 against the front sides of the keys. When the finger-button of any key is depressed, the bar 15 is thrown forward and the pawl 18 turns the cam-disk 19, the adjustment of the parts being such that the full downward stroke of the front end of the key will cause the pawl 18 to turn the cam-disk the full distance between two of its adjacent notches, and upon the release and resetting of the key and bar 15 the pawl 18 engages a new notch in the disk. When the operating-keys of the set are all in their normal position of rest, the cam-disk 19 is in such a position that the tooth 23 upon the rear side of the arm 41 of the lever 21 fits in one of the notches of the disk and the pawl 66 on the forward arm of the lever 21 engages the rack 63. When any one of the keys is depressed, as is the near key in the view shown in Figs. 1 and 2, the turning of the cam-disk by the pawl 18 forces the tooth 23 out of the notch in which it has been resting and causes it to ride upon the periphery of the disk. This throws forward the arm 41 and disengages the pawl 66 from the rack 63. As the operated key is further depressed to its limit of stroke the cam-disk is turned forward until the tooth 23 springs into the succeeding notch and the pawl 66 simultaneously engages the rack 63. As the tooth 23 will remain in this notch until the cam-disk is turned forward by the next operation of a key, the pawl 66 remains in engagement with the rack 63 until such second operation. It results from this that when any key is operated the first portion of its downward stroke disengages the pawl 66 from the rack 63, and thereby releases the indicator and permits it to drop out of sight or return to zero, the arm 64 at the same time moving to its rearmost position and the rack 63 to its highest position, which brings the lower end of the latter just above the pawl 66. As the operation of the key continues the upper end of its curved extension 2ª comes into contact with the registering-bar 12 and moves said bar forward, causing the arm 65 to press forward the arm 64 and throw the rack 63 downward. Just at the completion of the stroke of the key, when the indicator has been moved to a position to expose the proper number to indicate the value of the key, the tooth 23 springs into a second notch in the cam-disk and the pawl 66 engages the proper tooth of the rack 63 to hold the indicator in the position to which it has been moved by the full stroke of the key. Thus if the one-cent key be operated the upper end of its curved extension will not engage the registering-bar 12 until the key has nearly completed its downward stroke, so that the full stroke of the key will move the bar 12 only far enough to cause the wheel 14 to be turned one notch and the rack 63 to be thrown downward the distance of one notch; but as the bar 15 is moved the same distance by all the keys the pawl 18 will turn the cam-disk 19 the full distance between two of its notches, and as the tooth 23 engages the new notch at the completion of the stroke of the key the pawl 66 will engage the lowermost tooth of the rack 63, and thereby hold the indicator in position to expose the number "1." So upon the operation of the five-cent key the rack 63 will be thrown downward just far enough to permit the pawl 66 at the completion of the stroke of the key to engage the fifth tooth of the rack 63, and thereby hold the indicator in position to expose its number "5" at the reading-opening. I also utilize the movement of the lever 21 which takes place just at the completion of a stroke of a key to lock the registering-wheel at that instant, and thereby prevent its momentum from turning it any farther than it has been turned by the positive stroke of the pawl 11. This lock is shown in Figs. 1, 2, and 18, where it will be seen that the lower side of the forwardly-projecting arm of the lever 21 has upon it a pendent lug or extension 67, which carries a locking-tooth 68. When the tooth 23 springs into the notch of the cam-disk just at the completion of the stroke of the key, the rearward movement of the lever 21 carries the locking-tooth 68 into engagement with the ratchet of the registering-wheel 14 and positively locks said wheel from further movement.

For the purpose of disengaging the pawl 11 from the ratchet of the registering-wheel 14 at the completion of the stroke of an operated key and holding it out of engagement during the return stroke of such key I provide an arm 42, pivoted at its lower end, at 43, and carrying at its upper end a friction-roller 44, which engages the lower side of the pawl 11 or a part rigid therewith. When the tooth 23 springs into the notch of the cam-disk at the completion of the stroke of an operated key, the rearward movement of the arm 41 causes its upper end to strike the under side of the arm 42 and throw up the free end of the latter, and thereby lift the pawl 11 out of engagement with the ratchet of the wheel 14. It holds it out of engagement with the ratchet until at the beginning of the next operation of the key the turning of the cam-disk forces the tooth 23 out of the notch in which it has been resting and presses the arm 41 forward away from the arm 42, as shown in Fig. 1. This prevents any turning of the registering-wheel by a key after such key has been given its full stroke and before it has been reset to normal position.

Figure 4:
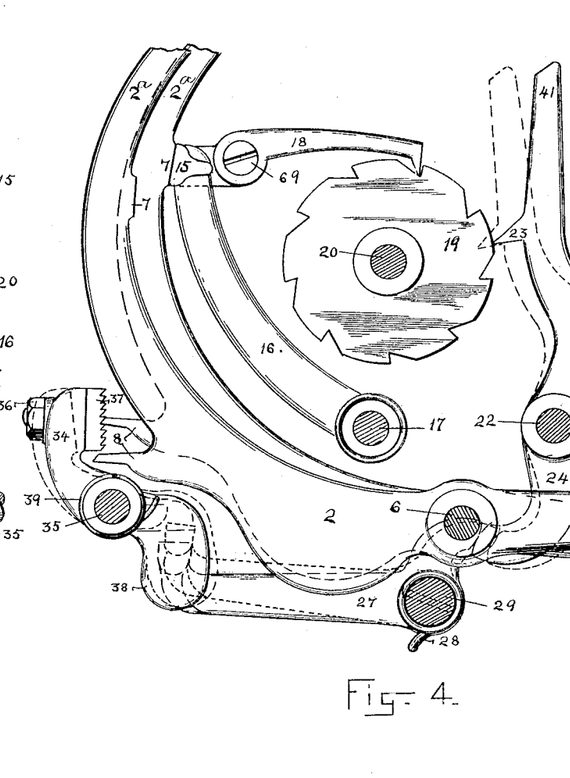
Fig. 4 is a detail view of a portion of the machine, showing parts of the operating-keys, the arrester co-operating therewith, the cam-disk, and associated devices.
Figure 5:
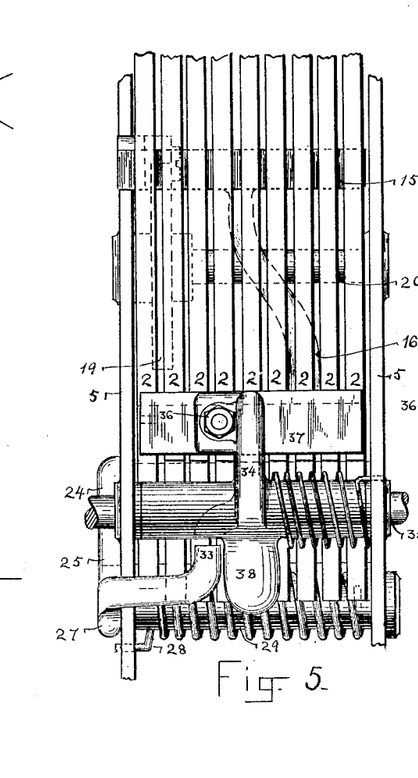
Fig. 5 is a rear elevation of the parts shown in Fig. 4.

The next feature of my invention relates to what may be termed a "key-arrester"—a device designed to arrest a key which is only partially operated and then released and prevent the resetting of such key until it has been given its full stroke and has thereby indicated and registered its full value. This arrester is shown in Figs. 1, 2, 4, and 5, where it will be seen to consist of a ratchet-bar 37, extending across the rear sides of the curved extensions of all of the keys of the set and supported by an arm 34, carried by a sleeve mounted to rock upon a shaft 35. Each of the keys has upon the lower rear side of its curved extension a tooth 8, which co-operates with the ratchet-bar 37. A spring coiled around the sleeve upon the shaft 35, as shown in Fig. 5, presses the arm 34 and ratchet-bar 37 forward toward the teeth 8; but in the normal position of the working parts of the machine (which is not the position shown in the drawings, since there one of the keys is partially depressed) the ratchet-bar 37 is thrown rearward and maintained out of engagement with the teeth 8 by the engagement of the arm 33 with an arm 40, fast upon or integral with the sleeve which carries the arm 34 and ratchet-bar 37 and projecting forwardly from said sleeve. The arm 33, which engages the arm 40, is carried by a lever 27, fulcrumed upon a shaft 29. A spring surrounding the shaft 29, as shown in Fig. 5, presses the rear end of the lever 27 upward, and when any key of the set is depressed, as shown in the drawings, and the tooth 23 of the lever 21 thereby forced out of its notch in the cam-disk and the upper portion of the lever thrown forward, the lower arm 24 of said lever is thrown rearward and engages the upper short arm 25 of the lever 27 and forces the latter downward against the tension of its spring, and thereby withdraws the arm 33 from engagement with the arm 40 and permits the ratchet-bar 37 to be thrown by its spring into engagement with the tooth of the operated key, as shown in Figs. 1, 2, and 4. In this position of the parts it will be seen that the rear end of the key may travel upward freely, its tooth 8 slipping over the teeth of the ratchet-bar 37; but if it is released it cannot drop back or be forcibly reset to normal position, because of the engagement of its tooth 8 with the ratchet-bar. As it is moved to its full stroke, however, a second notch in the cam-disk 19 is brought beneath the tooth 23 and the latter springs into it, as before explained, thereby throwing forward the lower arm 24 of the lever 21 and releasing the lever 27, whose spring immediately throws its rear end upward, causing its arm 33 to strike the arm 40 and force the ratchet-bar 37 rearward and maintain it out of engagement with the tooth 8 of the operated key, so that the latter is then free to be reset to normal position.

I prefer to arrange the bar 37 to act not only as an arrester for operated keys, but as a lock for the unoperated keys, to prevent any of them being operated until the key which has been started is given a full stroke. To this end the lower edge of the bar 37 is arranged to move over the teeth 8 of the unoperated keys when said bar moves forward to engage the tooth of the operated key in the manner before explained. Thus in Figs. 1, 2, and 4 it will be seen that not only is the partially-operated key arrested and prevented from returning to normal position, but all of the keys which are at rest are locked from movement by the lower edge of the bar 37, which overlies the rear ends of the teeth 8 of all of them. The key-arresting and key-locking functions of the bar 37 are, however, distinct, and the bar may be employed for either purpose without the other. Thus its lower edge might be so beveled off that it would not lock the unoperated keys, while on the other hand its lower edge might be shaped to lock the unoperated keys, but the front face of the bar be left smooth, so that it would not act as an arrester for operated keys. When the rear end of the lever 27 is thrown upward by its spring at the completion of the stroke of an operated key, as before explained, its extreme rear end, preferably provided with a knob or hammer 26, strikes a gong 30 and sounds an alarm.

From the above description it will be understood that whenever any key is slightly depressed the bar 37 moves forward to engage the tooth 8 of the key and to bring its lower edge over the teeth 8 of all the unmoved keys, and thereby lock the latter, but that as soon as the depressed key has been given its full downward stroke the bar 37 is thrown rearward again to release such key and unlock the unmoved keys. In addition to such locking of the unoperated keys during the downward or positive stroke of an operated key it is sometimes desirable to hold the unoperated keys locked during the return or up stroke of the operated key, so that the unoperated keys will be locked from movement from the moment an operated key is displaced from normal position until it is returned to such position. For this purpose I have provided a lock which may be employed in connection with or in substitution for the locking of the keys by the bar 37. This lock is located at the forward side of the machine and is shown in Figs. 1, 2, 14, and 15. As there shown, each of the keys 2 is provided on its upper side, shortly to the rear of its front end, with an upwardly-projecting hook 45, and on its lower side, approximately in line with the hook 45, with a pendent lug 46. Upon a pivotal support 52, above the upper ends of the hooks 45, is hung by means of a hub or sleeve and side arms 51 a locking-bar 54, which co-operates with the hooks 45 on the keys. The locking-bar 54 normally tends from its own gravity to swing forward beneath the hooks 45, as shown by the solid lines in Fig. 14; but in the normal position of the parts it is held in the position indicated by the dotted lines in said figure by means of a detaining-frame composed of a lever 47, pivotally supported at 48 and having its upper end at 50 bent inward into position to engage one of the arms 51 of the locking-bar 54. A spring 53, coiled around the shaft 48 and bearing upon the lever 47, normally holds the upper end of said lever thrown rearward and its lower end forward to the position indicated by the dotted lines in Fig. 14, in which position the upper end 50 of said lever engages one of the arms of the locking-bar 54 and holds said bar in the position indicated by its dotted lines in Fig. 14 out of engagement with the hooks 45 on the keys. If the upper end of the lever be thrown forward, the locking-bar 54 will at once swing forward beneath the hooks 45, and thereby lock the keys from downward movement. Secured to or formed integral with the lower end of the lever 47 is a bar 49, extending across all of the keys of the set immediately in rear of the beveled lower ends of the pendent lugs 46 on the under sides of the keys when the latter are in their normal position of rest, as shown in case of the near key in Fig. 14, where the dotted lines of the bar 49 indicate its normal position, the solid lines showing the position to which it has been moved by the depression of the other key in said figure.

Figure 14:
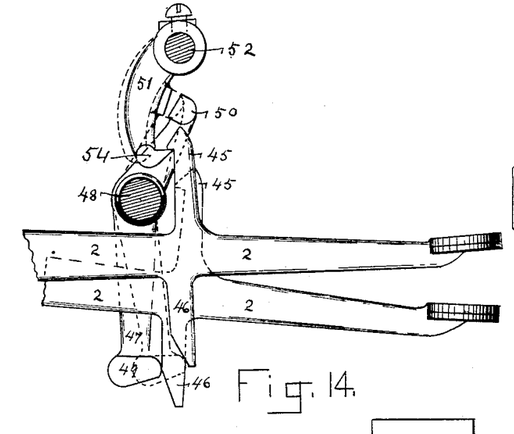
Fig. 14 is a detail of the front portion of several operating-keys and the locking device which co-operates with them to lock the unoperated keys during the movement of the operated key.
Figure 15:
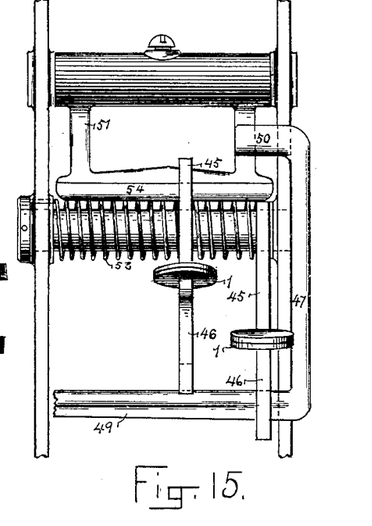
Fig. 15 is a front elevation of the parts shown in Fig. 14.

It results from the above construction that when the keys are in their normal position the locking-bar 54 is maintained out of engagement with the hooks 45 by the lever 47, so that any key can be freely depressed, and that when any key is depressed its pendent lug 46 strikes the bar 49 and throws forward the upper end of the lever 47, whereupon the locking-bar 54 immediately swings forward beneath the hooks of all of the unmoved keys and locks the latter from operation, holding them locked until the resetting of the operated key permits the spring 53 to move the bar 49 forward again and throw the upper end of the lever 47 rearward to disengage the bar 54 from the hooks 45.

The next feature of my invention relates to a combined locking and actuating pawl for the registering-wheels, the former transmitting movement to the registering-wheel and the latter locking the wheel from any excess of movement caused by its own momentum. I have hereinbefore described a lock which is automatically thrown into engagement with the ratchet of the registering-wheel at the completion of the stroke of an operated key to prevent excess of movement of such wheel, and that lock may be employed where the wheel is actuated by a simple pawl, such as is shown in Figs. 1 and 2; but my combined actuating and locking pawl is designed to accomplish the same result in a different way without the necessity of the automatic lock before referred to. This feature of my invention is shown in Figs. 6, 8, 17, 18, and 19, where it will be seen that the registering-wheel 14 is provided on its periphery with two ratchets having oppositely-facing teeth. The ordinary actuating-pawl 11, engaging one of these ratchets, is provided with a second locking-tooth 79, engaging the other ratchet. The tooth 79 positively locks the registering-wheel from any movement independently of the actuating-pawl 11. When any key is operated, and the registering-bar 12 and pawl 11 thereby thrown forward, the wheel 14 is turned forward the proper distance, the tooth 79 and the tooth of the pawl 11 both remaining in engagement with their respective ratchets, and positively preventing the wheel 14 moving any farther forward than the pawl itself moves. At the completion of the stroke of the operated key and full forward movement of the wheel 14 the pawl 11 and tooth 79 are lifted out of engagement with the ratchets by the trip-arm 42, which, as before explained, is thrown upward by the rearward movement of the arm 41 as the tooth 23 on the latter springs into a notch in the cam-disk 19 just at the completion of the stroke of the key, so that the pawl 11 is free to move backward to normal position with the registering-bar 12.

Figures 6, 7, 8, 8A, 8B:
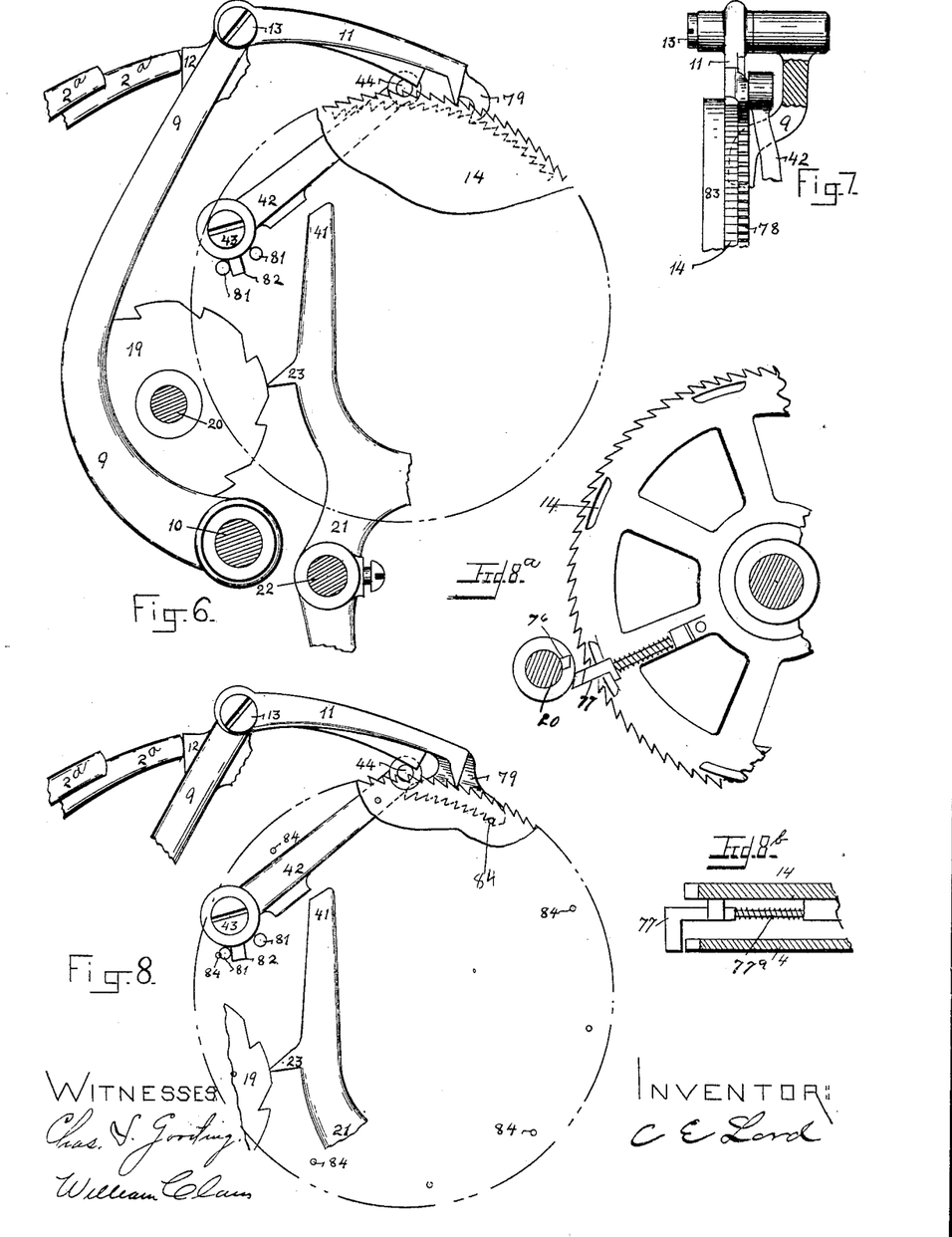
Fig. 6 is a detail view of a portion of the machine, showing the cam-disk, the ratchet of one of the registering-wheels, its actuating-pawl, and some of the associated parts.
Fig. 7 is a detail front view of a portion of one of the registering-wheels, its actuating-pawl, and some of the co-operating parts.
Fig. 8 is a detail illustrating a modification of some of the parts shown in Fig. 6.

In Fig. 8 to accomplish the same result the wheel 14, instead of being provided with a second ratchet, as shown in Fig. 6, has upon its side near its periphery a series of equidistant pins 84, and the part 79 of the pawl 11, which constituted the locking-tooth in Fig. 6, is here extended into a locking-ratchet, which co-operates with the pins 84. This locking-ratchet is always in engagement with one or another of such pins during the forward movement of the pawl 11 and wheel 14 and prevents the wheel moving farther forward than the pawl 11. At the completion of the stroke of the operated key the pawl 11, with its locking-ratchet 79, is lifted out of engagement with the wheel 14 by the trip-arm 42 in the manner before explained.

In Figs. 17 and 18 the actuating-pawl and the locking-pawl are shown as composed of two separate pieces independently pivoted at 13 to the registering-bar 12 or its supporting-arm 9. The registering-wheel is provided with two ratchets, as in Fig. 6, with one of which the actuating-pawl 11 engages, and with the other of which the locking-pawl 79 engages. In a lug which projects laterally from the pawl 79 over the pawl 11 is mounted a set-screw 80. As the trip-arm 42 is thrown upward at the completion of the stroke of the operated key the actuating-pawl 11 is first disengaged from its ratchet on the wheel 14, while the locking-pawl 79 remains engaged with the other ratchet on said wheel until the upper side of the pawl 11 strikes the lower end of the set-screw 80 and lifts the pawl 79 out of engagement with its ratchet. Such being the case, the wheel 14 is held for an instant after the actuating-pawl 11 has been disengaged from its ratchet, so that there is time for its momentum to be overcome by the pawl 79 before the latter is lifted. The set-screw 80 may be adjusted to permit the pawl 11 to be lifted a greater or less distance before it begins to lift the pawl 79.

The next feature of my invention relates to a novel form of friction device which I have applied to the registering-wheel, and as shown in Fig. 16. There it will be seen that three of the registering-wheels belonging to one set of keys or one section of the machine are arranged side by side, two of them being mounted upon a sleeve 70, fast in the frame 5 and surrounding the indicator-shaft 60, heretofore described. Fast upon the wheel 70, between the primary wheel 14 and the second wheel 4, is a collar 71, against which the hub of the wheel 14 is pressed by spiral springs confined in housings in the frame-work 5 and bearing against a friction-washer fitted on the sleeve 70 at the right side of the wheel 14. The housings for the springs are closed at their right-hand ends by screw-plugs, which may be adjusted to cause the springs to bear with more or less force against the washer 73 to consequently increase or lessen the friction against which the wheel 14 must be turned. The wheel 4 is pressed against the left-hand side of the collar 71 by other spiral springs confined in like housings in the frame and bearing against a similar washer 73 upon the left-hand side of said wheel. The third wheel 72 is not mounted upon the sleeve 70, but upon a bearing upon the frame-work itself, and is pressed against the fixed friction-collar 74 by a coiled spring acting on a plug 75, bearing against the side of said wheel.

The remaining feature of my invention relates to a novel form of transfer mechanism for adding the number of revolutions of one registering wheel upon the next higher wheel of its set. This transfer device is shown in Figs. 2, 8$^a$, and 8$^b$. The primary registering-wheel 14, whose revolutions it is desired to add upon the secondary wheel 4, carries in a suitable guide upon its side a radially-sliding pawl 77. This pawl is normally pressed outward by a suitable spring 77$^a$, and projects beyond the periphery of the registering-wheel upon which it is mounted. The tooth at its outer end projects laterally into line with the ratchet of the secondary wheel, so that when the pawl is pressed inward against the tension of its spring it will engage the ratchet of the secondary wheel. As the primary wheel completes a revolution and is brought to the position shown in Fig. 2 the outer end of its pawl 77 strikes the beveled face of a cam 76, fast upon the fixed shaft 20, and is forced inward against the tension of its spring into engagement with the ratchet of the secondary-wheel, and as the primary wheel turns onward the pawl 77 as it passes beneath the cam 76 will turn the secondary wheel one tooth of its ratchet. The instant the pawl 77 clears the cam 76 it is forced outward by its spring, and thereby disengaged from the ratchet of the secondary wheel, so that the latter remains stationary while the primary wheel turns on. When the latter completes another revolution, its pawl 77 is again forced inward by the cam 76 and turns the secondary-wheel another notch of its ratchet, as above explained.

Where several sets of keys or several sections—such as I have above described—are combined into a single machine, as shown in Fig. 3 of the drawings, it is desirable that the single-alarm gong 30 shall be sounded whenever a key in any one of the several sets is operated. It is also desirable that when a single key in any set is operated all of the unoperated keys in all of the sets shall be locked. To this end the movable parts or levers 21, which co-operate with the cam-disk 19, may all be made fast upon a single shaft 22, extending entirely across the machine, said shaft being arranged to rock in its bearings. Under such an arrangement the operation of any one of the cam-disks 19 will move all of the levers 21 and consequently all of the levers 25 to 27 with the result heretofore described. So the cross-bars 49, which co-operate with the lugs 46 on the under sides of the keys, may be merged into one bar extending entirely across the machine, as shown in Fig. 3 of the drawings, so that when any key in the machine is depressed the upper ends of all of the levers 47 will be thrown forward and all of the locking-bars 54 permitted to swing under the hooks of the operated keys, or the same result may be accomplished by making all of the levers 47 fast upon a single rock-shaft 48, extending entirely across the machine.

While the part 21, as illustrated and described, constitutes a lever fulcrumed at 22, it will be understood that it is simply a movable part co-operating with the notched cam-disk 19 for the purpose described and is not essentially a lever. So far as the operation of the trip-arm 42, the pawl 66, and the wheel-lock 68 are concerned, that part of the lever 21 below its fulcrum might be omitted. So, too, the operation of the trip-arm 42 is independent of the operation of the pawl 66 and wheel-lock 68, and the operations of the latter two might be independent of each other. The lever 21 may therefore be said to be as to most of its functions simply a means of transmitting movement from the cam 19 to the several parts, and such movements might be transmitted to each of those parts through independent means instead of a common means, as the lever 21.

My invention is not limited to the details of construction nor to the form and arrangement of the parts illustrated in the accompanying drawings, except so far as such details and form and arrangement may be indicated in the annexed claims. So far as its principal features are concerned, they consist in the broad combinations of parts set forth in my claims and are not restricted further than the terms of the latter imply.

Having thus fully described my invention, I claim—

1. The combination of a series of operating-keys representing different values, an indicator actuated thereby and moved to different positions by the operations of different keys to indicate their respective values, a latch for holding the indicator in the position to which it is moved by an operated key, and a trip for said latch operated at the beginning of the next operation of a key to release the indicator.

2. The combination of a series of operating-keys representing different values, an indicator actuated thereby and moved to different positions by the operations of different keys to indicate their respective values, a ratchet and pawl co-operating with the indicator to hold it in the position to which it is moved by an operated key, and a trip for disengaging the ratchet and pawl at the beginning of the next operation of a key to release the indicator.

3. The combination of a series of operating-keys representing different values, an indicator actuated thereby and moved to different positions by the operations of different keys to indicate their respective values, a ratchet movable with the indicator, a pawl engaging said ratchet at the completion of the stroke of an operated key to hold the indicator in the position to which it has been moved by such key and disengaged from the ratchet at the beginning of the next operation of a key to release the indicator.

4. The combination of the key-levers 2, having upwardly and forwardly curved extensions $2^a$, the bar 12, co-operating with the latter, the indicator-shaft 60, a connection between the bar 12 and shaft 60, by which the latter is moved different distances upon the operation of different keys, an indicator moved by said shaft, a ratchet 63, movable with the shaft, the revoluble notched cam-disk 19, actuated by the key-levers, and the lever 21, provided with a tooth 23, bearing against the periphery of the cam-disk, and with a pawl-tooth 66, co-operating with the ratchet 63, substantially as described.

5. In a registering and indicating machine, the combination of a series of operating-keys of different values, a revoluble notched cam-disk, as 19, actuated by the operating-keys and moved the same distance by each of them, and a movable part, as 21, provided with a tooth 23, spring-pressed against the periphery of the cam-disk and co-operating with the notches therein in the manner described to cause a quick movement of such part 21 at the completion of the stroke of an operated key.

6. The combination of the key-levers 2, movable bar 15, common to all of them and moved the same distance by each of them, pawl 18, revoluble notched cam-disk 19, and the lever 21, provided with a tooth 23, bearing against the periphery of the cam-disk 19 and co-operating with the notches therein, for the purpose described.

7. The combination of a series of operating-keys representing different values, a registering-wheel, a pawl actuated by the operating-keys to turn the registering-wheel different distances, according to the key which is operated, and a trip for disengaging the pawl from the registering-wheel at the completion of the stroke of an operated key.

8. The combination of the key-levers 2, having the upwardly and forwardly curved rear extensions $2^a$, a registering-bar 12, the pawl 11, the registering-wheel 14, the trip-arm 42, revoluble cam-disk 19, actuated by the key-levers 2, and the movable part 41, co-operating with the trip-arm 42 and provided with a tooth 23, bearing upon the periphery of the cam-disk 19, substantially as described.

9. The combination of the key-levers 2, having upwardly and forwardly curved rear extensions $2^a$, the bar 12, co-operating with the latter, the pawl 11, and registering-wheel 14, the arm 65, movable with the bar 12, the indicator-shaft 60, the arms 61 and 64, fast on said shaft, the former engaged by the arm 65 and the latter supporting the ratchet 63, the cam-disk 19, actuated by the key-levers 2, and the movable part 21, provided with a tooth 23, bearing against the periphery of the cam-disk 19, and with a tooth 66, co-operating with the ratchet 63, substantially as described.

10. In a registering-machine, the combination of a registering-wheel provided with two ratchets having oppositely-facing teeth, a combined actuating and locking pawl, one of whose teeth engages one of said ratchets to actuate the wheel and the other of whose teeth engages the other of said ratchets to lock the wheel against excess of movement, and a trip for disengaging the pawl from the ratchets at the completion of the stroke of an operated key.

11. In a registering-machine, the combination of a series of operating-keys, a registering-bar, as 12, moved different distances by the operation of different keys, a registering-wheel 14, provided with two ratchets having oppositely-facing teeth, a pawl 11, carried by the bar 12 and provided with an actuating-tooth engaging one of the ratchets of the registering-wheel and with a locking-tooth 79, engaging the other ratchet of said wheel, and a trip for lifting the pawl at the completion of a stroke of an operated key.

12. In a registering-machine, the combination of a series of operating-keys representing different values, a registering-wheel provided with a ratchet and moved different distances by the operation of different keys, a revoluble cam-disk 19, actuated by the operating-keys, and a movable part 21, provided with a tooth 23, co-operating with the notches in the cam-disk 19, and with a locking-tooth 68, which is thrown into engagement with the ratchet of the registering-wheel at the completion of the stroke of the operated key, for the purpose described.

13. The combination of the key-levers 2, provided with teeth 8 at their rear ends, the bar 37, spring-pressed toward said teeth, means for maintaining said bar out of engagement with said teeth when the key-levers 2 are all in their normal position of rest, the revoluble cam-disk 19, actuated by the key-levers 2, and a movable part 21, provided with a tooth 23, co-operating with the cam-disk 19 to cause the part 21 to release the bar 37 upon the operation of any key and permit said bar to be moved by its spring into position to co-operate with the teeth of the keys.

14. The combination of the key-levers 2, provided with the teeth 8 at their rear ends, the ratchet-bar 37, pivotally supported on the shaft 35 and having rigid with it an arm 40, a spring applied to the ratchet-bar to press it forward, a lever 25 to 27, provided with an arm 33, arranged to engage the arm 40 and maintain the ratchet-bar 37 in its rearmost position when all of the key-levers are at rest, a spring applied to the lever 25 to 27 to normally hold the arm 33 in engagement with the arm 40, a revoluble notched cam-disk 19, actuated by the key-levers 2, and a lever 21, provided with a tooth 23, bearing against the periphery of the cam-disk 19 and having a pendent arm 24, co-operating with the arm 25 of the lever 25 to 27 to withdraw the arm 33 from engagement with the arm 40 upon the operation of any key-lever and permit the ratchet-bar 37 to be moved by its spring into engagement with the tooth 8 of such lever, substantially as described.

15. The combination of a series of operating-keys, each provided with an upwardly-projecting hook, a locking-bar normally tending to move beneath said hooks to lock the keys, and means for normally holding the locking-bar out of engagement with said hooks and for releasing said bar upon the operation of any key to permit it to move beneath said hooks and lock the unoperated keys.

16. The combination of the key-levers 2, each provided near its front end with an upwardly-projecting hook 45 and a downwardly-projecting lug 46, a locking-bar 54, normally tending to move beneath the hooks 45 to lock the keys, and a detaining-frame for normally holding the locking-bar 54 out of engagement with the hooks 45, and co-operating with the lugs 46 to release the locking-bar 54 when any key is operated and permit said bar to move beneath the hooks of the operated keys.

17. The combination of the key-levers 2, each provided with an upwardly-projecting hook 45 and with a downwardly-projecting lug 46, a locking-bar 54, pivotally supported at 52 and normally tending to swing under the hooks 45, a detaining-frame composed of the lever 47 and cross-bar 49, and a spring yieldingly holding the lever 47 in position to maintain the locking bar 54 out of engagement with the hooks 45 and the cross-bar 49 in position to be engaged by the lug 46 of an operated key, substantially as described.

18. In a registering-machine, the combination of the independently-revoluble registering-wheels 4 and 14, mounted side by side upon a suitable support, the fixed collar 71 between them, the washers 73, bearing against their outer sides, and the spiral springs confined in housings in the frame-work and bearing against said washers, for the purpose described.

CHARLES EDGAR LORD.

Witnesses:
A. H. SANBORN,
C. H. FISHER.